US00RE37682E

(19) United States
(12) Reissued Patent
Yaniv

(10) Patent Number: US RE37,682 E
(45) Date of Reissued Patent: *Apr. 30, 2002

(54) METHOD OF FABRICATING A LIQUID CRYSTAL DISPLAY

(75) Inventor: Zvi Yaniv, Austin, TX (US)

(73) Assignee: LG.Philips LCD Co., Ltd., Seoul (KR)

( * ) Notice: This patent is subject to a terminal disclaimer.

(21) Appl. No.: 09/441,139

(22) Filed: Nov. 16, 1999

Related U.S. Patent Documents

Reissue of:

(64) Patent No.: 5,576,070
Issued: Jun. 1, 1992
Appl. No.: 08/150,788
Filed: Nov. 12, 1993

U.S. Applications:
(

(63) Continuation of application No. 09/195,076, filed on Nov. 18, 1998, now Pat. No. Re. 36,711, which is a continuation of application No. 08/068,305, filed on May 28, 1993, now Pat. No. 5,281,450, which is a continuation of application No. 07/890,855, filed on Jun. 1, 1992, now abandoned.

(51) Int. Cl.[7] ..... C08J 7/04

(52) U.S. Cl. ..... 427/510; 156/99; 156/108; 156/145; 156/310; 427/165; 427/169; 427/269; 427/270; 427/272; 427/289; 427/389.7; 427/393.5; 427/512; 427/514; 427/521; 427/555; 427/557; 427/595; 427/596

(58) Field of Search ..... 156/99, 108, 145, 156/310; 427/165, 169, 269, 270, 272, 289, 389.7, 393.5, 512, 514, 521, 555, 557, 595, 596, 510

*Primary Examiner*—Bernard Pianalto
(74) *Attorney, Agent, or Firm*—Long, Aldridge & Norman LLP

(57) ABSTRACT

A light influencing element and the process of fabricating the same is disclosed, wherein the light influencing element is fabricated by disposing a layer of a substantially opaque material upon a transparent substrate. One or more openings or wells may then be cut or formed in the surface of the layer of opaque material. Into such openings a light influencing material is then disposed, preferable said materials are injected thereinto as by ink-jet type injection heads. Liquid crystal displays and subassemblies formed upon the light influencing elements of the instant invention are also provided.

20 Claims, 2 Drawing Sheets

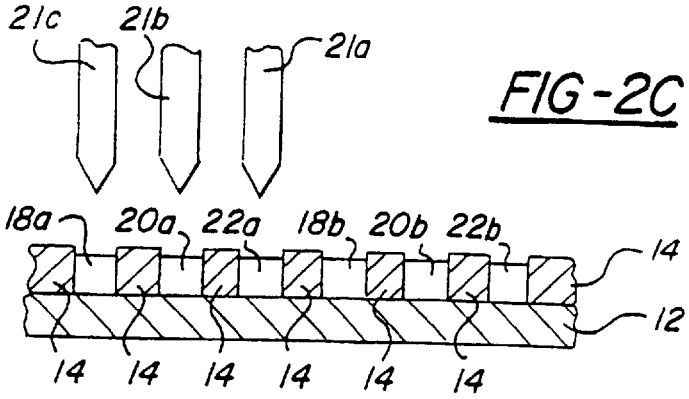
FIG-2C
FIG-3A
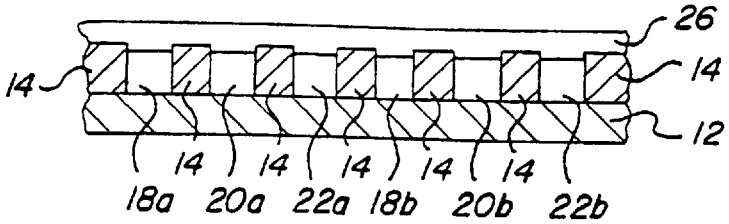
FIG-3B
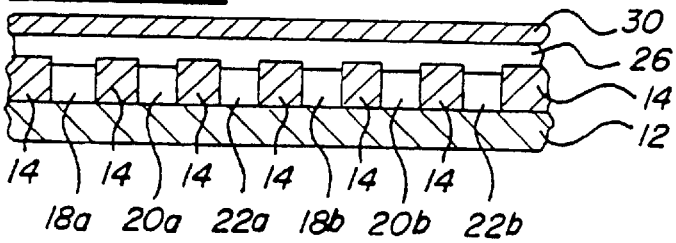
FIG-3C
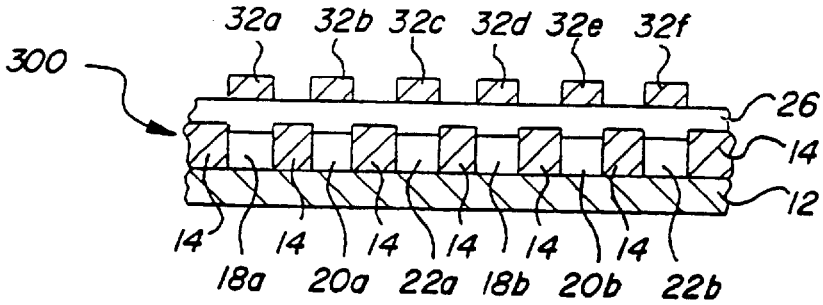
FIG-4
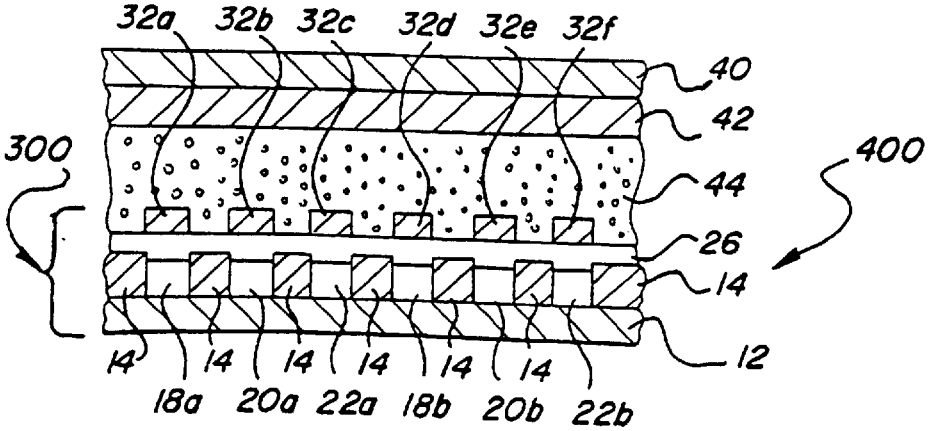

METHOD OF FABRICATING A LIQUID CRYSTAL DISPLAY

Matter enclosed in heavy brackets [ ] appears in the original patent but forms no part of this reissue specification; matter printed in italics indicates the additions made by reissue.

This application is a continuation of application Ser. No. *09/195,076 filed Nov. 18, 1998, RE 36,711 which is a RE of Ser. No. 08/150,788 filed Nov. 12, 1993, U.S. Pat. No. 5,576,070 which is a CON of* Ser. No. 08/068,305 filed May 28, 1993, U.S. Pat. No. 5,281,450, which is itself a continuation of application Ser. No. 07/890,855 filed on Jun. 1, 1992, now abandoned.

FIELD OF THE INVENTION

The present invention relates generally to the field of light influencing elements for use in high resolution optical systems, and particularly to a method of making such elements. The invention more particularly relates to light influencing elements adapted to act as a color filter for optical systems such as image scanning systems and active or passive liquid crystal display devices. In it's most specific form, the instant invention relates to high resolution color filter elements, and methods of making the same, which are adapted to all or pan of a liquid crystal display device, such as an active matrix liquid crystal display, disposed thereupon.

BACKGROUND OF THE INVENTION

Efficient production of full color systems for use in cameras, television, etc. have been contemplated since at least as early as the late 1950's and are generally discussed in an article which appeared in the May 1959 edition of Scientific American. Reference may also be made to U.S. Pat. Nos. 3,382,317, 3,443,023 and 3,443,025. As optical system technology evolved, so too did the technology employed in providing full color thereto.

High resolution electronic optical systems, such as for example, either active or passive liquid crystal displays, and contact image scanning systems are today well known in the commercial fields. While systems of the type described above have been generally successful in fulfilling their intended purposes and have found commercial acceptance, these systems exhibit several deficiencies. The deficiency specifically addressed herein relates to the fact that heretofore, the light influencing elements used in high resolution optical systems, to, for example, polarize or color filter light passing therethrough, have been very difficult to fabricate, often requiring up to ten or more fabrication steps. The result of having so many fabrication steps is that the manufacturing process is very costly, and further that the process is susceptible to producing high amounts of unacceptable or scrap light influencing elements. This of course further increases the cost of the light influencing elements.

As noted above, color liquid crystal display devices are well known in the art, and one exemplary such device is set forth in U.S. Pat. No. 4,632,514 to Ogawa, et al, entitled "COLOR LIQUID CRYSTAL DISPLAY APPARATUS". The '514 patent describes a color, twisted nematic type display wherein the layer of liquid crystal material is varied depending upon the color imparted to each picture element of the display. Ogawa, et al describe the need to terrace the layers of filter materials, which, as will be noted in greater detail hereinbelow, require additional fabrication steps in the manufacture of a display.

The commonly accepted method of fabricating light influencing elements for high resolution optical systems, particularly liquid crystal displays, is set forth in an article entitled Multicolored Liquid Crystal Displays, published in Optical Engineering, Vol. 23 No. 3, May/June 1984. More particularly, FIG. 11 thereof illustrates in a step-by-step manner, the conventional photolithographic method of fabricating color filter elements for liquid crystal display. As a perusal of said article teaches, a color filter element is fabricated by depositing a layer of transparent gelatine glue, known in the art as "fish glue" atop the display electrodes, which have already been formed upon a transparent substrate. A photomask is then applied so that the transparent gelatine glue is removed from all ares other than atop a display electrode. Thereafter, a layer of photoresist material is disposed atop the entire device substrate and a photomask is applied so that, assuming a red-green-blue color filter arrangement, all electrodes and gelatine layers to be colored red are exposed, while the electrodes to be colored blue or green remain covered by photoresist. The exposed gelatine glue is then dyed red and the dye is cured. Thereafter, the photoresist is removed from the electrodes to be dyed green and blue, and a new layer of photoresist is applied over the entire device substrate, and a photomask is applied to expose the electrodes to be colored blue. The exposed gelatine glue is then dyed blue and the dye is cured. The same process is then repeated to provide the green dyed electrodes.

An alternative, dry-etching technique is set forth in an article entitled Fabrication of mosaic color filters by dry-etching dielectric stacks, Journal of Vacuum Science Technology, A4(1), Jan/Feb 1986. The approach is illustrated fully in FIG. 3 thereof, which clearly illustrates the need to etch, mask and re-etch the deposited materials in order to achieve the desired color configuration. Moreover, this approach is limited to certain color combinations and arrangements as two or more filter layers may be needed to produce a single color.

A third commonly accepted method of providing color filter materials is set forth in an article entitled Multicolor Graphic LCD with tricolor layers formed by electrodeposition, and published in the 1984 Society for Information Display Digest. In this article, the authors set forth an electrodeposition method for depositing and patterning color filter layers. In this method, certain electrode layers were activated so as to cause dyed pigments to be electrochemically deposited thereupon. Thereafter, a second set of electrodes is activated so that a second color can be deposited, and so on for all subsequent colors to be deposited. While this method does not require the deposition and patterning of filter material layers, it does require the deposition and patterning of electrode layers, and the subsequent electrodeposition steps for each color.

In addition to the deficiencies inherent in the multistep deposition/etch processes discussed hereinabove, none of such methods of fabricating a light influencing element provide a light barrier around each color filter so as to eliminate the presence of stray, non-filtered light. Such stray, non-filtered light has the effect of washing out the color of the light that is being transmitted through the color filter. The result is that the color image looses sharpness and intensity. A light blocking layer around color filters or display picture elements is commonly called a black matrix in the field. The provision of a black matrix has heretofore involved the subsequent deposition of a light blocking layer of material around the filters or the picture elements after such elements have been formed. The result is the need to provide additional photoresist deposition, mask and etch steps in order to provide the black matrix, with the most often result being greater expense attributable to more costly processing and greater losses cause by the manufacturing process itself.

These and other limitations of the prior art are obviated by the invention disclosed and claimed herein.

BRIEF DESCRIPTION OF THE INVENTION

It is an object of the present invention to provide a light influencing element for high resolution electronic optical systems, and a method of fabricating the same which avoids the need to employ repeated photolithographic steps.

It is a further object of the instant invention to provide a light influencing element which also includes a black matrix layer for improving the contrast, resolution and sharpness of optically enhanced light passing therethrough.

It is a further object of the instant invention to provide liquid crystal display devices and subassemblies thereof which may be fabricated upon the light influencing element of the instant invention.

These and other objects are achieved by fabricating light influencing elements which by a comprising the steps of: providing a substantially transparent substrate member, disposing a layer of a substantially opaque material upon one side of said substrate; forming at least one opening through said layer of substantially opaque material; and disposing a light influencing material in said at least one opening. The substantially transparent substrate member is typically selected from the group of materials consisting of glass, plastic and combinations thereof.

The layer of substantially opaque material is disposed to a thickness of between 0.10 and 100.0 $\mu$m, and preferably between 1.0 and 10.0 $\mu$m. This opaque material may be fabricated from a deposit of materials such as a polymeric material, metallic materials, semiconductor materials and combinations thereof, though in a preferred embodiment, the material is a black polyimide material.

One or more openings or wells are formed through said layer of substantially opaque material. The formation of such openings is accomplished by employing a method such as a high power laser, or a photolithographic etch process to cut or eat away the opaque material. When the embodiment of a laser is employed, a high power excimer laser capable of at least micron scale resolution is required to be placed in close proximity to said substrate and layer of opaque material. Depending upon the application desired for the light influencing element, a plurality of similarly sized and shaped vias arranged in a densely packed, uniformly spaced M×N array may be provided. Alternatively, the array of vias may be arranged into a series of interlocking triangles or "triads", or elongated stripes.

Into the opening or openings is disposed a light influencing materials as by providing a light influencing material in non-solid phase having the optical characteristics thereof optimized for the desired application, which material is injected in a sufficient amount so as to achieve a desired light influencing effect. Thereafter, the material is curing from the non-solid to the solid phase.

In one embodiment, the light influencing element is adapted to function as a color filter element for a liquid crystal display or a subassembly thereof. In this application, the light influencing material is adapted to color white light into the group of colors consisting of red, green, blue and combinations thereof.

These and other objects and advantages of the subject invention will become apparent from a perusal of the detailed description of the invention, the drawings and the claims which follow.

BRIEF DESCRIPTION OF THE DRAWINGS

FIGS. 2A, 2B and 2C illustrate, in a partial cross-sectional side view taken along line 2—2 of FIG. 1, the inventive method of fabricating the light influencing element of FIG. 1;

FIGS. 3A, 3B and 3C illustrate in cross-sectional, partial side view, the processing steps involved in fabricating a liquid crystal display subassembly, from the light influencing element of FIGS. 1 and 2; and FIG. 4 illustrates in cross-sectional, partial side view the processing steps required in order to fabricate a liquid crystal display from the liquid crystal subassembly and light influencing element of FIGS. 1, 2 and 3.

DETAILED DESCRIPTION OF THE INVENTION

A. Light Influencing Element

Figure 1:
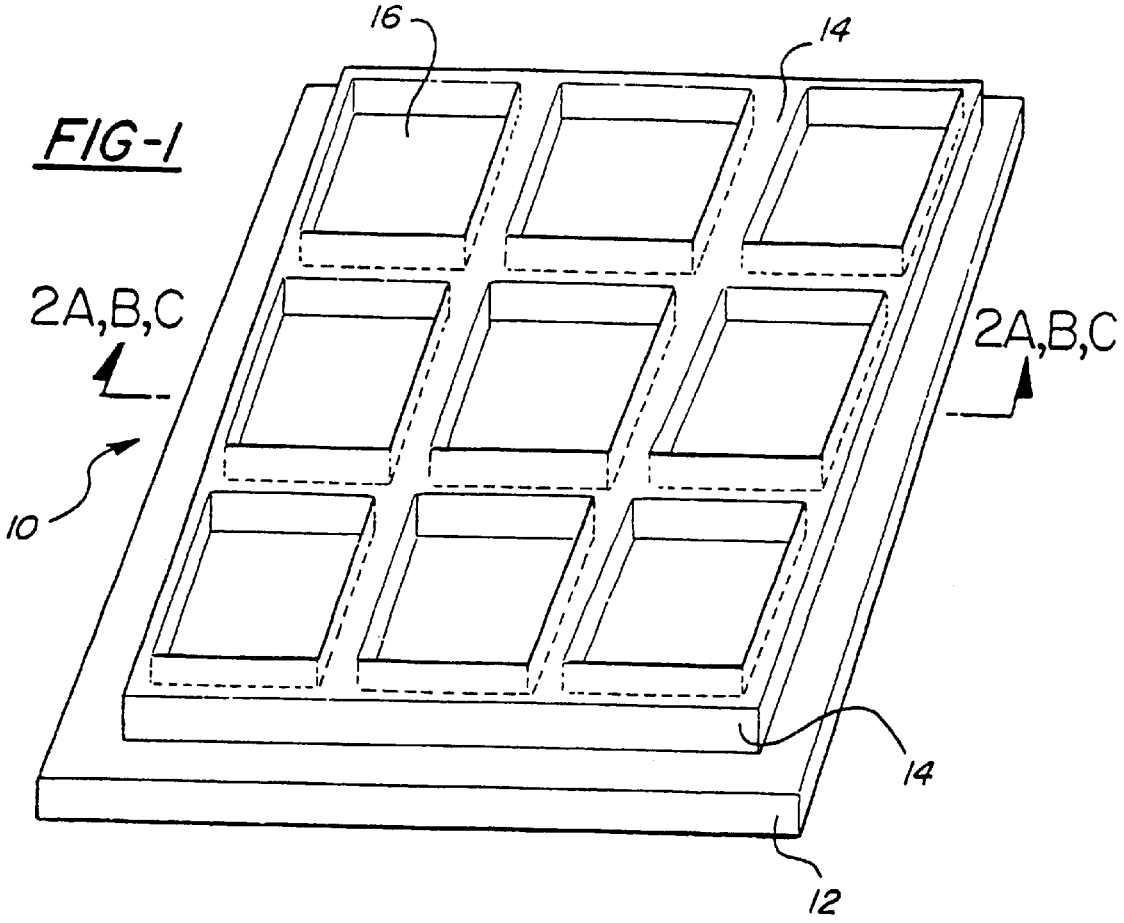
FIG. 1 illustrates in perspective view, the light influencing element of the instant invention.

Referring now to FIG. 1, there is illustrated therein, in perspective view, the light influencing element of the instant invention, identified generally by the reference numeral 10. The light influencing element 10 will typically be employed as a color filter element, as is explained in greater detail hereinbelow, though it is to be understood that such an element may be employed in a number of different applications including, but not limited to, a light diffuser, a light collimator, a light polarizer or a light rotating element. Alternatively, the light influencing element may be adapted to provide an optical effect upon radiation not in the range of visible light. Hence, said element may be adapted to filter certain wavelengths of radiation such as infra-red or ultra violet.

The light influencing element 10 includes a transparent substrate 12, which serves as the base upon which subsequent structures are formed. The substantially transparent substrate 12, is typically fabricated from a device quality, high temperature sheet of glass, which is free from defects and optical inclusions. Alternatively, the substrate may be formed from other substantially transparent materials such as a clear plastic or other polymeric material which may be either rigid, as glass, or flexible as would be the case for a thin, polymeric material such as a layer of kapton, or polycarbonate materials of the type that are currently used in numerous applications wherein considerations such as hardness and optical clarity are of paramount importance.

Disposed upon said substrate 12 is a layer of substantially opaque material 14. The layer of substantially opaque material 14 may typically be formed of a polymeric material such as a black polyimide material deposited to a thickness of between 0.10 and 100.0 $\mu$m, and preferably between 1.0 and 10.0 $\mu$m. Alternatively, the layer of substantially opaque material 14 may be formed of a metallic material, such as, but not limited to, tin, chromium, molybdenum or tantalum deposited to a thickness sufficient to substantially prevent the transmission of light therethrough. The layer of substantially opaque material 14 may otherwise be formed from a layer of a non-metallic, and non-polymeric material, such as a layer of amorphous silicon or an amorphous silicon alloy material, again deposited to a thickness sufficient to prevent the transmission of light therethrough. In one preferred embodiment, the layer of substantially opaque material is a layer of black polyimide material deposited to a depth of between 1.0 and 10.0 $\mu$ms.

Formed in said layer of substantially opaque material 14 is at least one opening 16 which extends through said layer 14 to the substrate 12. The number and spacing of the at least one opening, in the event that there are more than one, will depend upon the ultimate application in which the light influencing element is to be used employed. For example, if the element 10 is to be used as a color filter in a liquid crystal display, then the size, packing density, number and pitch of the picture elements (or pixels) of the display will determine the size, packing density, number and pitch of the openings 16 in the light influencing element 10. Alternatively, the openings may be formed as one or more elongated strips in the layer of substantially opaque material.

The openings 16 themselves may be formed by any one of a number of techniques, such as a conventional photolithographic and etch technique. In one preferred embodiment of the method of the instant invention, which is described in greater detail hereinbelow, the openings 16 are formed by employing a high resolution i.e., capable of at least micron scale resolution, high power laser device, such as an excimer laser adapted to cut a plurality of similarly sized and shaped openings in the layer of substantially opaque material 14. The element 10 of FIG. 1 may be adapted, as mentioned above to use in conjunction with a liquid crystal display. Hence, the excimer laser should be able to form a plurality of openings 16 formed in a highly packed N×M matrix of rows and columns. In FIG. 1, the element 10 is arranged as a matrix of 3×3 openings, though it is to be understood that the element 10 may be arranged to include any number of openings arranged in rows and columns, or in any other fashion, such as a series of interlocking triangles or "triads", or elongated stripes.

Disposed in each of the openings 16 is a light influencing material selected to provide a desired optical effect. For example, if the light influencing material is to be employed as a color filter element, dye, ink such as the ink used in so-called ink-jet technology or other color pigments may be disposed in said openings 16. The dyes or pigments, which may be either of the additive or subtractive variety, would be disposed in a manner and to a thickness sufficient to, for example, color white light red as it passed therethrough. Having appropriately prepared the light influencing element 10 so as to provide a desired optical effect, the element 10 may then be adapted to serve as the foundation upon which an entire electronic optical device, or some subassembly thereof, is fabricated.

Figure 2A:
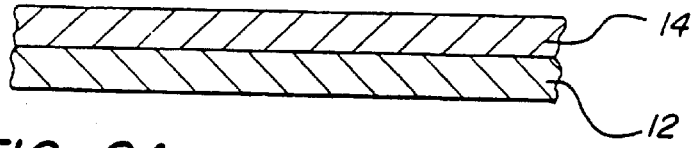
Figure 2B:
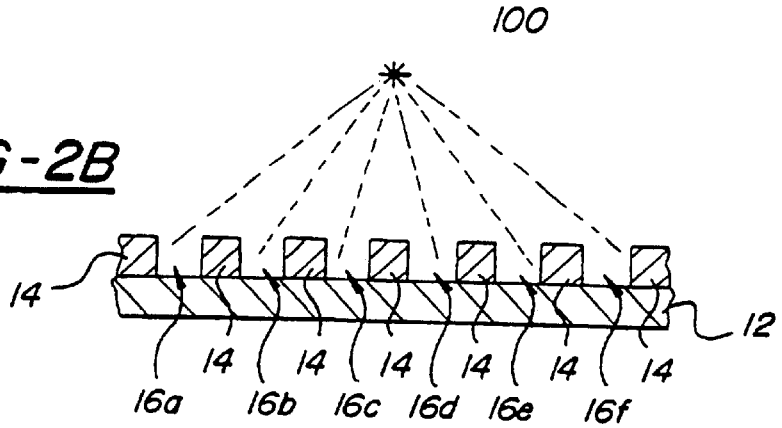

Turning now to FIGS. 2A, 2B and 2C, there is illustrated therein, in a partial cross-sectional side view taken along line 2—2 of FIG. 1, a light influencing element fabricated according to the instant invention. More particularly, FIG. 2A illustrates the substrate 12, having a layer of substantially opaque material 14 deposited on one surface thereof. As noted hereinabove, the substantially opaque material 14 may be fabricated of a metal, semiconductor or a polymeric material, though in one preferred embodiment, the layer of substantially opaque material 14 is a layer of black polyimide material, deposited by, for example, spin coating or blade application, to a depth of between 1.0 and 10.0 $\mu$m, so as to prevent the passage of light therethrough.

Referring now to FIG. 2B, the substrate 12 and layer of opaque material 14 are placed in relative close proximity to and are exposed to a high power, high resolution laser device such as an excimer laser 100. The high power, high resolution laser 100 is employed to form, as by cutting, at least one opening in the layer of opaque material 14. In FIG. 2B, the laser has formed six (6) openings 16a, 16b, 16c, 16d, 16e and 16f in layer 14. The excimer laser 100 must be capable of at least micron resolution, and thus should be able to form a plurality of openings in a highly packed N×M matrix of rows and columns. In FIG. 1, the element 10 is arranged as a matrix of 3×3 openings of which FIG. 2 illustrates but six openings in a row of 8, though it is to be understood that the element 10 may be arranged to include any number of openings arranged in rows and columns, or in any other fashion, such as triads or stripes.

In order to form more than one opening in the layer of opaque material 14, it is necessary to effect some type of relative movement between the substrate and the laser. As the laser is capable of very high resolutions, the tolerances for any movement must be very precise so as to not upset the resolution and patterning of the openings. It is therefore necessary to provide a precise raster-type or other conventionally known step and repeat type device for scanning the laser across the surface of the substrate 12 and layer 14. Alternatively, the substrate 12 and layer 14 may be scanned across a stationary laser source 100.

Turning now to FIG. 2C, the substrate 12 with the layer of opaque material 14 having a plurality of openings 16a–16f formed therein is placed in relatively close proximity to means for injecting a light influencing material into said openings. Further, in one preferred embodiment of the invention, these injection means comprise three injection nozzles 21a, 21b, and 21c which are adapted to inject, for example, dye, ink or color pigments into the openings 16a–16f, in so-called "ink-jet" fashion. The nozzles 21a–21c or the substrate 12 may either be fitted with apparatus to effect relative movement therebetween so that one or more nozzles may be used to fill each opening. Hence, in the application wherein the light influencing element 10 of FIG. 1 is a color filter element having red, green and blue filters, nozzle 21a may be adapted to inject red dye, ink or pigment into opening 16a to create red filter 18a, nozzle 21b may be adapted to inject blue dye, ink or pigment into opening 16b to create blue filter 20a, and nozzle 21c may be adapted to inject green dye, ink or pigment into opening 16c to create green filter 22a. Thereafter, either the substrate 12 or the nozzles 21a–21c may be moved over to the next untilled openings 16d–16f, wherein nozzle 21a injects red dye, ink or pigment into opening 16d to create red filter 18b, nozzle 21b injects blue dye, ink or pigment into opening 16e to create blue filter 20b, and nozzle 21c injects green dye, ink or pigment into opening 16f to create green filter 22b. This step and repeat process is continued until all of the openings have been filled.

The light influencing material disposed in each opening can be any one of several materials which are initially in a non-solid state, i.e. a liquid, an aqueous solution, a suspension, an emulsion or even a rapidly condensing gas. The non-solid material will possess the optical characteristics necessary to accomplish a desired task such as polarization or color filtering of light passing therethrough. Moreover, the physical characteristics of the material, such as viscosity, color coordinates, etc. are to be optimized for a desired application and performance when injected in ink-jet fashion from nozzles 21a–21c. Preferred materials to be used in the openings of the light influencing element 10, include ink, dyes or pigmented inks, gelatins, organic materials and water soluble materials and such other materials that can be made susceptible to injection as by ink-jet technology.

After injecting said non-solid light influencing materials into said openings 16a–16f, it is necessary to cure said injected materials to the solid state. This may be accomplished by any one of a number of means ranging from allowing the materials to harden by exposure to ambient conditions, to placing the substrate and materials disposed thereon into an oven, such as an autoclave or infra-red oven, and exposing said materials to those conditions until cured to the solid state. In this manner, it is possible to fabricate a light influencing element, such as a color filter for use in conjunction with a high resolution liquid crystal display device, without encountering the limitations of the prior art methods.

B. Liquid Crystal Subassembly

A liquid crystal display subassembly may be obtained by employing the liquid influencing element 10 of FIGS. 1 and 2. More particularly, FIGS. 3A, 3B and 3C illustrate in cross-sectional, partial side view, the processing steps involved in fabricating a liquid crystal display subassembly, such as the so-called passive plate, from the light influencing element of FIGS. 1 and 2. The subassembly, fully illustrated in FIG. 3C as 300, is fabricated by disposing a continuous layer of a transparent, passivating material 26 atop the color filters 18a, 18b, 20a, 20b, 22a and 22b and black polyimide layer 14 of the light influencing element 10 of FIGS. 1 and 2. The passivating material 26 is adapted to, and must be deposited to a depth sufficient to perform at least two critical functions: 1) to level the underlying filter and opaque layers to a continuous, flat surface to serve as a base upon which subsequent layers may be formed; 2) to electrically insulate the light influencing element 10 from any electrically conductive layers that may be disposed upon the passivating layer; and 3) to provide a flat, level surface so as to assure a uniform thickness for any layer of liquid crystal material disposed thereon. As light must be able to pass through the element and subassembly, it is necessary for the passivating layer 26 to be formed from a layer of material that is also transparent. In one preferred embodiment of the instant invention, the transparent, insulating, passivating material 26 is formed from a transparent, organic material such as a transparent resin, $SiN_x$, $SiO_x$, polyimides and combinations thereof.

Thereafter, a layer of a transparent, conductive material, such as a transparent conductive oxide material 30 of FIG. 3B, is disposed upon the passivation layer 26. Preferred transparent conductive oxides include indium oxide, tin oxide, indium tin oxide, cadmium sulfate and combinations thereof. Thereafter, employing photolithographic techniques well know in the an, the layer of transparent conductive material 30 is patterned to form a plurality of electrodes 32a–32f, which electrodes are formed directly above the openings 16a–16f, which define color filters 18a, 18b, 20a, 20b, 22a and 22b, though are separated therefrom by the passivation layer 26. Alternatively, the layer of transparent conductive material 30 may be left unpatterned to achieve a so-called common electrode. Accordingly, the subassembly 300 would include a plurality of aligned color filters and electrodes arranged in an N×M matrix array. In this way, it is possible to fabricate a liquid crystal display subassembly which avoids the limitations inherent in the prior art.

C. Liquid Crystal Display Device

A liquid crystal display device may be obtained by employing the liquid crystal subassembly of FIGS. 3A, 3B and 3C. More particularly, FIG. 4 illustrates in cross-sectional, partial side view the processing steps required in order to fabricate a liquid crystal display 400 from the liquid crystal subassembly 300 and light influencing element 10 of the instant invention. The liquid crystal subassembly 300 is employed to fabricate a liquid crystal display by providing a second substrate 40, which substrate 40 is typically fabricated from a device quality, high temperature sheet of glass, which is free from defects and optical inclusions. Alternatively, the substrate 40 may be formed from other substantially transparent materials such as a clear plastic or other polymeric material which may be either rigid, as glass, or flexible as would be the case for a thin, polymeric material such as a layer of kapton, or polycarbonate materials of the type that are currently used in numerous applications wherein considerations such as hardness and optical clarity are of paramount importance.

The second substrate 40 has disposed thereupon a layer of transparent conductive material such as a transparent conductive oxide material 42. Preferred transparent conductive oxides include indium oxide, tin oxide, indium tin oxide, cadmium sulfate and combinations thereof. The layer of transparent conductive material 42 may be either a continuous layer or may be a patterned layer of display electrodes formed by conventional photo-lithographic processes. The second substrate 40 may also have disposed thereon other micro-electronic devices such as transistors or diodes which enhance the switching and other performance of the display. The second substrate 40 is arranged so that the second layer of transparent conductive material 42 is spacedly disposed from and facing the patterned layer of transparent conductive material disposed on the first substrate 12. A layer of liquid crystal material, such as a twisted nematic, cholesteric or other liquid crystal is disposed between said first and second substrate 12 and 40, which layer of material will effect a change in optical characteristic from transparent to opaque upon application of an electrical charge thereto. By employing the light influencing element of FIGS. 1 and 2 as a color filter element upon which a liquid crystal display is fabricated as described herein, it is possible to achieve a full color liquid crystal display device free from the processing limitations inherent in the prior art.

As may be readily appreciated by those skilled in the art, the present invention can be practiced other than as is specifically disclosed herein. Thus, while the instant invention has been described with respect to certain preferred embodiments thereof, it is to be understood that the foregoing and other modifications and variations may be made without departing from the spirit or scope thereof.

I claim:

[1. A method of fabricating a liquid crystal display subassembly, said method comprising the steps of:

providing a substantially transparent substrate member;

disposing a layer of substantially opaque material upon one side of said substrate, said substantially opaque material being a black polyimide material;

forming at least one opening through said layer of substantially opaque material;

disposing a light influencing material in said at least one opening;

disposing a continuous layer of a transparent, passivating material atop said layer of opaque material and said light influencing material; and disposing a layer of transparent, conductive material atop said passivating layer.]

[2. A method as in claim 1, wherein the step of providing a substantially transparent substrate member includes the further step of selecting said member from the group of materials consisting of glass, plastic, and combinations thereof.]

[3. A method as in claim 1, wherein the step of disposing a layer of substantially opaque material upon said substrate includes the further step of disposing said material to a thickness of between 0.10 and 100.0 $\mu$m.]

[4. A method as in claim 3, wherein the opaque material is disposed to a thickness of between 1.0 and 10.0 μm.]

[5. A method as in claim 1, wherein the step of forming at least one opening through said layer of substantially opaque material is accomplished by employing a method selected from the group of a high power laser, a photolithographic etch process, and combinations thereof.]

[6. A method as in claim 5, wherein the step of forming at least one opening includes the further steps of:

providing a high power excimer laser capable of at least micron scale resolution;

placing said substrate with said layer of opaque material in close proximity to said laser;

providing means for achieving relative movement between said laser and said substrate; and employing said laser to cut at least one opening in said layer of opaque material.]

[7. A method as in claim 1, wherein the step of forming at least one opening includes the further step of forming a plurality of similarly sized and shaped openings, arranged in a densely packed, uniformly spaced array.]

[8. A method as in claim 1, wherein the step of disposing a light influencing material into said at least one opening includes the further steps of:

providing a light influencing material in a non-solid phase having the optical characteristics thereof optimized for a desired application; injecting a sufficient amount of said light influencing material into said openings so as to achieve a desired light influencing effect; and curing said non-solid light influencing material to the solid phase.]

[9. A method as in claim 8, wherein the step of injecting light influencing material into said openings includes the further steps of:

providing at least one nozzle for injecting said materials, in close proximity to one of said openings;

providing means for achieving relative movement between said nozzle and said opaque material coated substrate, for disposing light influencing material into preselected ones of said openings.]

[10. A method as in claim 9, wherein the step of curing said light influencing material includes the further steps of:

providing infrared oven means; and disposing said substrate, layer of opaque material, and light influencing material into said oven means so as to solidify said light influencing material.]

[11. A method as in claim 1, including the further step of selecting a light influencing material adapted to color white light.]

[12. A method as in claim 11, wherein said light influencing material is adapted to color light into the group of colors consisting of red, green, blue, and combinations thereof.]

[13. A method of fabricating a liquid crystal display, said method comprising the steps of:

providing a substantially transparent first substrate member;

disposing a layer of substantially opaque material upon one side of said first substrate;

forming at least one opening through said layer of substantially opaque material;

disposing a light influencing material in said at least one opening;

disposing a continuous layer of a transparent, passivating material atop said layer of opaque material and said light influencing material;

disposing a layer of transparent, conductive material atop said passivating layer;

providing a second substantially transparent substrate member having a continuous layer of a transparent conductive material disposed on one surface thereof, said second substrate being spacedly disposed from said first substrate and arranged so that the layer of transparent conductive material of the second substrate faces the layer of transparent conductive material of the first substrate; and disposing a layer of liquid crystal material between said first and said second substrates.]

*14. A method of fabricating a liquid crystal display, said method comprising the steps of:*

*providing a substantially transparent first substrate member;*

*disposing a layer of substantially opaque material upon one side of said first substrate;*

*forming at least three openings through said layer of substantially opaque material;*

*injecting a light influencing material as a non-solid state including first, second, and third colors in said at least three openings directly on the first substrate;*

*curing said injected material to a solid state;*

*disposing a continuous layer of a transparent, passivating material atop said layer of opaque material and said light influencing material;*

*disposing a layer of transparent, conductive material atop said passivating layer;*

*providing a second substantially transparent substrate member having a layer of a transparent conductive material disposed on one surface thereof, said second substrate being spacedly disposed from said first substrate and arranged so that the layer of transparent conductive material of the second substrate faces the layer of transparent conductive material of the first substrate; and*

*disposing a layer of liquid crystal material between said first and second substrates.*

*15. A method as in claim 14, wherein said light influencing material is one of a dye, ink or a pigment.*

*16. A method as in claim 14, wherein said plurality of openings are arranged in rows and columns.*

*17. A method as in claim 14, wherein said plurality of openings are arranged in a series of interlocking triangles.*

*18. A method of fabricating a liquid crystal display, said method comprising the steps of:*

*providing a substantially transparent first substrate member;*

*disposing a layer of substantially opaque material upon one side of said first substrate;*

*forming a plurality of openings including at least three openings through said layer of substantially opaque material;*

*injecting a light influencing material including first, second, and third colors in said at least three openings directly on the first substrate;*

*repeating said injecting process until all of the plurality of openings have been filled;*

*disposing a continuous layer of a transparent, passivating material atop said layer of opaque material and said light influencing material;*

*disposing a layer of transparent, conductive material atop said passivating layer;*

*providing a second substantially transparent substrate member having a layer of a transparent conductive material disposed on one surface thereof, said second substrate being spacedly disposed from said first substrate and arranged so that the layer of transparent conductive material of the second substrate faces the layer of transparent conductive material of the first substrate; and*

*disposing a layer of liquid crystal material between said first and second substrates.*

*19. A method as in claim 18, wherein said light influencing material is selected one of dye, ink or pigments.*

*20. A method as in claim 18, wherein said plurality of openings are arranged in rows and columns.*

*21. A method as in claim 18, wherein said plurality of openings are arranged in a series of interlocking triangles.*

*22. A method of fabricating a liquid crystal display, said method comprising the steps of:*

*providing a substantially transparent first substrate member;*

*disposing a layer of substantially opaque material upon one side of said first substrate;*

*forming at least one opening through said layer of substantially opaque material;*

*disposing a light influencing material in said at least one opening;*

*disposing a continuous layer of a transparent, passivating material atop said layer of opaque material and said light influencing material;*

*disposing a layer of transparent, conductive material atop said passivating layer;*

*providing a second substantially transparent substrate member having a continuous layer of a transparent conductive material disposed on one surface thereof, said second substrate being spacedly disposed from said first substrate and arranged so that the layer of transparent conductive material of the second substrate faces the layer of transparent conductive material of the first substrate;*

*patterning the continuous layer of transparent conductive material; and*

*disposing a layer of liquid crystal material between said first and said second substrates.*

*23. A method as in claim 22, wherein the step of providing a substantially transparent substrate member includes the further step of selecting said member from the group of materials consisting of glass, plastic, and combinations thereof.*

*24. A method as in claim 22, wherein the step of disposing a layer of substantially opaque material upon said substrate includes the further step of disposing said material to a thickness of between 0.10 and 100.0 μm.*

*25. A method as in claim 24, wherein the opaque material is disposed to a thickness of between 1.0 and 10.0 μm.*

*26. A method as in claim 22, wherein the step of forming at least one opening through said layer of substantially opaque material is accomplished by employing a method selected from the group of a high power laser, a photolithographic etch process, and combinations thereof.*

*27. A method as in claim 26, wherein the step of forming at least one opening includes the further steps of:*

*providing a high power excimer laser capable of at least micron scale resolution;*

*placing said substrate with said layer of opaque material in close proximity to said laser;*

*providing means for achieving relative movement between said laser and said substrate; and*

*employing said laser to cut at least one opening in said layer of opaque material.*

*28. A method as in claim 22, wherein the step of forming at least one opening includes the further step of forming a plurality of similarly sized and shaped openings, arranged in a densely packed, uniformly spaced array.*

*29. A method as in claim 22, wherein the step of disposing a light influencing material into said at least one opening includes the further steps of:*

*providing a light influencing material in a non-solid phase having the optical characteristics thereof optimized for a desired application; injecting a sufficient amount of said light influencing material into said openings so as to achieve a desired light influencing effect; and*

*curing said non-solid light influencing material to the solid phase.*

*30. A method as in claim 29, wherein the step of injecting light influencing material into said openings includes the further steps of:*

*providing at least one nozzle for injecting said materials, in close proximity to one of said openings;*

*providing means for achieving relative movement between said nozzle and said opaque material coated substrate, for disposing light influencing material into preselected ones of said openings.*

*31. A method as in claim 30, wherein the step of curing said light influencing material includes the further steps of:*

*providing infrared oven means; and*

*disposing said substrate, layer of opaque material, and light influencing material into said oven means so as to solidify said light influencing material.*

*32. A method as in claim 22, including the further step of selecting a light influencing material adapted to color white light.*

*33. A method as in claim 32, wherein said light influencing material is adapted to color light into the group of colors consisting of red, green, blue, and combinations thereof.*

* * * * *

UNITED STATES PATENT AND TRADEMARK OFFICE

CERTIFICATE OF CORRECTION

PATENT NO. : RE 37,682 E
DATED : April 30, 2002
INVENTOR(S) : Zvi Yaniv

It is certified that error appears in the above-identified patent and that said Letters Patent is hereby corrected as shown below:

Title page,
Item [64], Related U.S. Patent Documents Data, change "Issued: Jun. 1, 1992" to -- Issued: Nov. 19, 1996 --.

Signed and Sealed this

Seventeenth Day of September, 2002

*Attest:*

*Attesting Officer*

JAMES E. ROGAN
*Director of the United States Patent and Trademark Office*